Jan. 16, 1962   J. K. FLOYD   3,017,570
AUTOMATIC BATTERY DISCHARGE MEANS
Filed Dec. 4, 1959
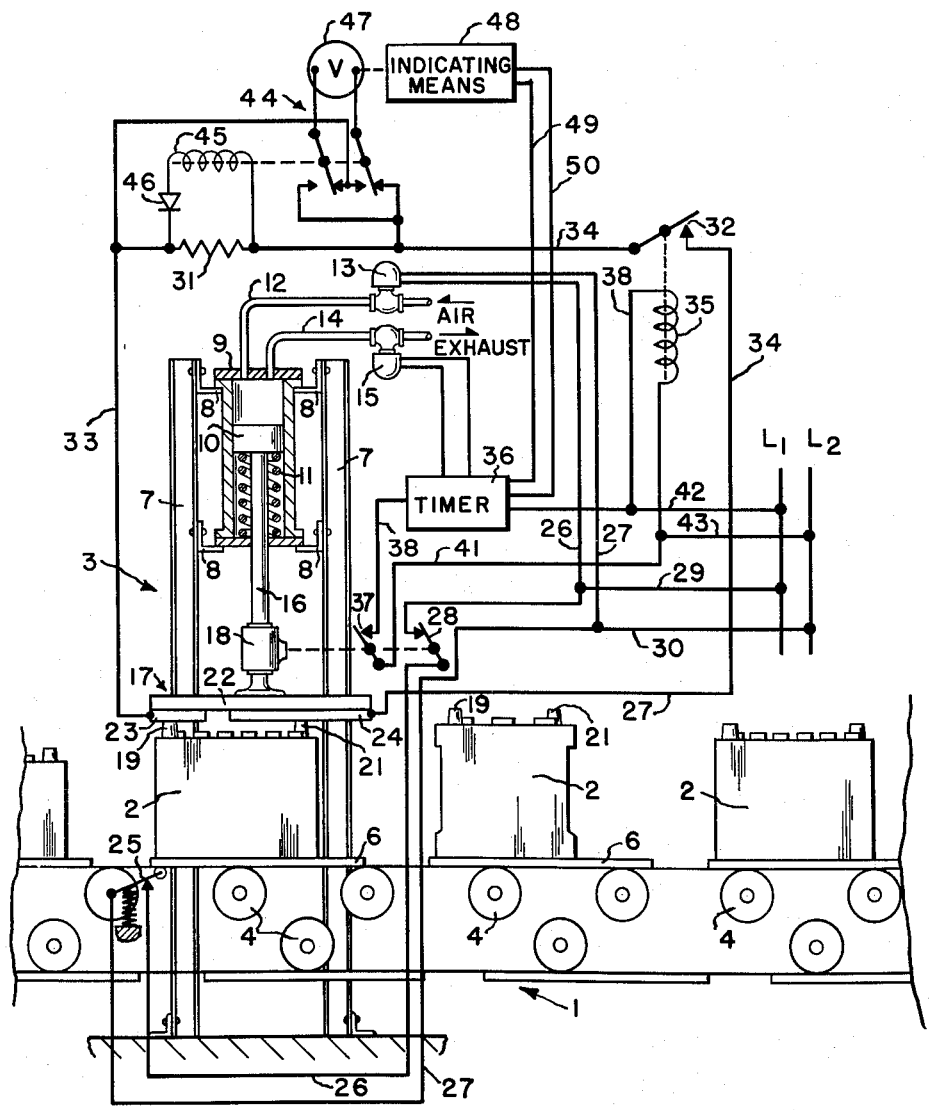
INVENTOR.
JAMES KERMIT FLOYD
BY
Robert J. Staples
ATTORNEY United States Patent Office 3,017,570
Patented Jan. 16, 1962

3,017,570
AUTOMATIC BATTERY DISCHARGE MEANS
James Kermit Floyd, Kirtland, Ohio, assignor to The Electric Storage Battery Company, a corporation of New Jersey
Filed Dec. 4, 1959, Ser. No. 857,426
7 Claims. (Cl. 324—29.5)

The present invention generally relates to a machine for testing storage batteries. More specifically, the present invention is concerned with a machine for performing a high rate discharge test on storage batteries.

The general object of the present invention is to provide a machine which will perform a high rate discharge test on storage batteries automatically.

In the manufacture of storage batteries of the type used for starting, lighting and ignition purposes in automobiles and trucks, it is standard practice to test batteries on the production line by subjecting them to a high rate discharge after formation or initial charging. This test discharge, which is made at a thousand ampere rate, is performed to reveal defects in the battery. For example, if the battery has received an incomplete formation the discharge will show a depressed voltage. If the electrodes have been incompletely connected or if the battery posts and straps have been poorly burned, the high rate discharge will cause such imperfect connections to be burned away and result in loss of voltage. Heretofore, this test has been made manually by stabbing the battery posts with sharp metallic points connected to a suitable discharge resistor and volt meter through flexible leaves. Such manual testing, however, has proved to be unsatisfactory because of inaccuracy due to a lack of uniformity in the pressure and area of the contacts made with the battery posts and the fact that it often results in the burning of the posts due to poor contact or the manual breaking of the circuit while current is flowing.

Accordingly, another object of the present invention is to provide a means for automatically providing for the uniform and accurate testing of batteries by means of a high rate discharge.

Still another object of the present invention is to provide means in a battery discharger for achieving a uniform contact pressure on the battery posts and means to prevent the breaking of such contact while current is flowing.

A further object of the present invention is to provide an automatic high rate battery discharge machine which is adapted to test batteries of different heights, widths and lengths without resetting.

A still further object of the present invention is to provide a machine which is adapted to perform a high rate discharge test on a battery regardless of the orientation of its terminals.

The foregoing and other objects of the present invention are accomplished by means which include a contact plate adapted to be brought in contact with the terminal posts of a battery by means of an air cylinder. When a battery to be tested is moved under the contact plate by means of an indexing conveyor, a load sensitive switch feeds air pressure to the air cylinder causing the contact plate to move downward into engagement with the battery posts. After the contact plate engages the posts, the pressure on the posts is measured by means of a hydraulic couple which controls the air to the cylinder. In this manner, the hydraulic couple that controls the pressure between the contact plate and the battery posts also acts as a control on the motion of a contact plate thus providing an automatic adjustment for various battery heights. The contact plate is divided electrically into two sections, one a short section adapted to contact as it is brought under the plate by the conveyor systems and the other a long section adapted to contact the other terminal of the battery. To accommodate batteries of different lengths, the second section of the contact plate is made long enough to contact the trailing terminal of the longest battery to be tested. The battery discharge circuit includes suitable indicating means and polarity sensing circuit.

A better understanding of the present invention may be had from the following description when read with reference to the accompanying drawing which is a schematic representation of the discharge machine of the present invention.

Referring now to the drawing, the numeral 1 indicates a conveyor adapted to carry storage batteries 2 in stepwise fashion through the automatic battery discharge testing machine of the present invention 3. The conveyor 1 is shown schematically as consisting of a plurality of rollers 4 and a belt 5 which carries a plurality of palets 6, each adapted to receive a storage battery 2. The automatic battery discharge machine 3 includes a supporting framework comprising the vertical posts 7 and the horizontal angles 8. The horizontal angles 8 support an air cylinder 9 which has been shown schematically as including an air operated piston 10 and a spring 11. Air is supplied to the cylinder 9 by means of an air line 12 under the control of a solenoid type pneumatic valve 13. Air is exhausted from the cylinder 9 through exhaust line 14 through another solenoid valve 15.

The piston 10 of the air cylinder 9 carries a shaft 16 which is attached to a contact plate 17 through a hydraulic couple 18. The contact plate 17, which is adapted to be brought into engagement with the terminal posts 19 and 21 of the battery 2 through the action of the air cylinder 9, is made longer and wider than the biggest battery to be tested. The contact plate 17 comprises an insulating plate 22 and two contact sections 23 and 24. The contact plate section 23 is adapted to make contact with the leading terminal post 19 of the battery 2 when it is moved under the contact plate by the conveyor 1. As shown, the contact plate section 23 is made relatively short and is spaced from the contact plate 24 which is adapted to make contact with the other terminal post of the battery 2. The contact plate section 24, however, is made long enough to make contact with the other terminal post 21 of the longest battery to be tested. By means of this construction, the machine is adapted to accommodate batteries of different lengths.

The control circuit for the battery discharge testing machine 3 includes a load sensitive switch 25 which is positioned so as to be activiated by the positioning of a palet 6 under the contact plate 17 through the action of the conveyor 1. The load switch 25 is connected in series with the solenoid valve 33 by means of the conductors 26 and 27 and the contacts 29 of the hydraulic couple 18 to control the operation of the valve 13 and hence, the feeding of air into cylinder 9. As shown, the conductors 26 and 27 are connected across suitable source of control current, shown here as the conductors $L_1$, $L_2$ by means of the conductors 29 and 30. The contact sections 23 and 24 of the contact plate 17 are connected to a battery discharge circuit including the discharge resistor 31 and a pair of relay contacts 32 by means of the conductors 33 and 34, respectively. The relay contacts 32 are associated with a relay coil 35, the operation of which is controlled by a timer 36 and the contacts 37 of the hydraulic couple 18. This circuit can be traced from the relay coil 35 through the conductor 37, the timer 36, the conductor 39, the contacts 37 of the hydraulic couple 18, and the conductor 41, back to the relay coil 35. This circuit is connected to the conductors $L_1$, $L_2$ for energization by means of the conductors 42 and 43.

A battery discharge measuring and indicating circuit, generally indicated as 44, is connected across the discharge resistor 31. This circuit includes the double pole, double throw relay 45 which is connected across the resistor 31 through a diode 46. The diode 46 polarizes the relay 45 which functions to connect a volt meter 47 across the discharge resistor 31 in accordance with the polarity of the discharge current. By means of the circuitry, the discharge machine is adapted to perform its testing function regardless of the orientation of the battery terminals. The volt meter 47 is a relay type volt meter adapted to control the operation of an indicating means 48. As will be understood by those skilled in the art, the indicating means 48 may comprise an audible alarm, a visual indicating means, or a suitable marking device such as a solenoid controlled spray gun. In operation, the volt meter 47 is set to activate the indicating means 48 when a test discharge indicates a depressed battery voltage. As shown, the indicating means 48 is connected to the timer 36 by means of the conductors 49 and 50. By means of this connection, the timer 36 is operative to deenergize the indicating means 48 except when a test discharge is being made thereby preventing a false indication of a depressed battery voltage.

In considering the operation of the discharge machine of the present invention, it should be understood that the conveyor 1 is adapted to move in stepwise fashion in such a manner that batteries placed on the palets 6 are moved through the discharge machine in steps which bring the batteries to rest under the contact plate 17 for a predetermined period of time. As a palet 6 on the conveyor 1 is moved into position under the discharge machine 3, it makes contacts with the load switch 25, closing the contacts thereof which energizes the solenoid valve 13 causing air to be supplied to the cylinder 9. As air is supplied to the cylinder 9 the piston 10 is depressed against the pressure of the spring 11, moving the contact plate 17 downwards into engagement with the terminal posts 19 and 21 of the battery 2. Once contact with the terminal posts of the battery is established, the pressure of such contact continues to increase until it reaches a predetermined value controlled by the hydraulic couple 18. When this pressure is reached, the hydraulic valve 18 turns off the solenoid valve 13 through the operation of the contacts 28. Simultaneously, the contacts 37, also associated with the hydraulic couple 18, are closed which causes the energization of the timer 36 which in turn energizes the relay 35. The energization of the relay 35 closes the contacts 32 which connects the discharge resistor 31 across the contact plate section 23 and 24, and hence across the battery terminals 19 and 21. The closing of the contacts 32 thus initiates the high rate discharge testing of the battery 2. The value of the discharge resistor 31 is chosen so as to discharge the battery at a rate high enough to accomplish the objectives of the test. In practice, a discharge at about 1,000 ampere rate has been found applicable.

If the direction of current flow through the resistor 31 is of such that no current flows through the relay coil 45 because of the diode 46, the volt meter 47 will remain connected as shown in the drawing. If the orientation of the terminals 19 and 21 of the battery 2 with respect to the contact plate 17 is such as to cause a current flow which will energize the relay 45, the volt meter 47 is reversed through the commutating action of the relay contacts and the test measurements are carried out as if the battery terminals were orientated in the opposite direction. In this manner the apparatus of the present invention is adapted to accept batteries regardless of the orientation of the battery termials. If the discharge of the battery is not sufficient to provide a predetermined voltage drop across the resistor 31 or if this voltage falls off at any time during the discharge test the volt meter will energize the indicator means and the battery may be marked for removal from the production line.

The length of time during which the battery is discharged is controlled by means of the timer 36. Thus, after a predetermined time, the timer 36 operates to deenergize the relay 35 which disconnects the discharge resistor from the contact plate 17. Simultaneously, the timer 36 energizes the solenoid valve 15 in the exhaust line of the air cylinder 9 which exhausts the air from the cylinder. As the air is exhausted from the cylinder 9, the spring 11 raises the contact plate 17 out of contact with the terminal posts of the battery 2 and the machine is ready to receive and test a new battery. In this respect, it should be noted, that the operation of the timer 36 is such as to coincide with the stepwise motion of the conveyor 1, and in that manner a complete discharge testing of a battery is carried out in the period during which the battery is brought to rest under the contact plate 17 by the action of the conveyor 1.

From the foregoing description it can be seen that the automatic battery discharge apparatus of the present invention is designed to assure uniform contact pressure between the contact plate and the terminals of the battery to be tested, regardless of the height of that battery. In addition, since the timer 36 which controls the connecting of the discharge circuit to the contact plate sections 23 and 24 also controls the physical breaking of the contact between the battery posts and the contact plate through the exhaust valve 15, burning of the battery posts by breaking the physical contact while current is blowing in the discharge circuit is prevented. It can also be seen that the discharge testing machine of the present invention is adapted, because of the unique construction of the contact plate 17, to accommodate batteries of various widths and lengths without resetting.

What is claimed is:

1. An apparatus for performing a discharge test on a storage battery comprising, in combination, a contact plate having a first section adapted to contact one terminal of the battery to be tested and a second section adapted to contact the other terminal of said battery, means for bringing said contact plate into contact with said battery terminals, pressure responsive means for regulating the pressure of said contact, a discharge circuit, means controlled by said pressure responsive means for connecting said discharge circuit to said contact plate and discharge measuring means connected across said discharge circuit.

2. An apparatus for performing a high rate discharge test on a storage battery comprising, in combination with a conveyor adapted to carry storage batteries and move them in discreet steps through said apparatus, a contact plate having a first section adapted to contact one terminal of a battery to be tested and a second section adapted to contact the other terminal of said battery, means for bringing said contact plate into contact with said battery terminals, when it is brought to rest beneath said contact plate by said conveyor, pressure responsive means for regulating the pressure of said contact, a discharge circuit, means controlled by said pressure responsive means for connecting said discharge circuit to said contact plate and discharge measuring means connected across said discharge circuit.

3. An apparatus for performing a high rate discharge test on a storage battery moving in stepwise fashion on a conveyor comprising, in combination, a contact plate having a first section adapted to contact one terminal of the battery to be tested and a second section adapted to contact the other terminal of said battery, means for sensing the presence of a battery beneath said contact plate, means responsive to said last named means for bringing said contact plate into contact with said battery terminals, pressure responsive means for regulating the pressure of said contact, a discharge circuit, means controlled by said pressure responsive means for connecting said discharge circuit to said contact plate and discharge measuring means connected across said discharge circuit.

4. An apparatus for performing a high rate discharge test on a storage battery moving in discreet steps on a conveyor comprising, in combination, a contact plate having a first section adapted to contact one terminal of the battery to be tested and a second section adapted to contact the other terminal of said battery means for sensing the presence of a battery beneath said contact plate, means responsive to said last named means for bringing said contact plate into contact with said battery terminals, pressure responsive means for regulating the pressure of said contact, a discharge circuit, means controlled by said pressure responsive means for connecting said discharge circuit to said contact plate, discharge measuring means connected across said discharge circuit, and timing means responsive to said pressure responsive means for timing said discharge.

5. An apparatus for performing a high rate discharge test on a storage battery moving in stepwise fashion on a conveyor comprising, in combination, a contact plate having a relatively short first section adapted to contact the leading terminal of the battery to be tested and a relatively long second section, insulated from said first section, adapted to contact the trailing terminal of said battery, means for sensing the presence of a battery beneath said contact plate, means responsive to said last named means for bringing said contact plate into contact with said battery terminals, pressure responsive means for regulating the pressure of said contact, a discharge circuit, means controlled by said pressure responsive means for connecting said discharge circuit to said contact plate sections and discharge measuring means connected across said discharge circuit.

6. An apparatus for performing a high rate discharge test on a storage battery moving in stepwise fashion on a conveyor comprising, in combination, a contact plate having a first section adapted to contact the leading terminal of a battery brought into position under said plate by said conveyor and a second section adapted to contact the trailing contact of said battery, means for sensing the presence of a battery beneath said contact plate, air operated means responsive to said last named means for bringing said contact plate into contact with said battery terminals, hydraulic means for regulating the pressure of said contact, a discharge circuit, means controlled by said hydraulic means for connecting said discharge circuit to said contact plate, and timing means for timing said discharge.

7. An apparatus for performing a high rate discharge test on a storage battery moving in stepwise fashion on a conveyor comprising, in combination, a contact plate having a first section adapted to contact the leading terminal of a battery brought into position under said plate by said conveyor and a second section adapted to contact the trailing contact of said battery, said second section being insulated from said first section and substantially longer than said first section, means for sensing the presence of a battery beneath said contact plate, air operated means, responsive to said last named means for bringing said contact plate into contact with said battery terminals, hydraulic means for regulating the pressure of said contact, a discharge circuit, means controlled by said hydraulic means for connecting said discharge circuit to said contact plate, timing means controlled by said hydraulic means for timing said discharge, and polarity sensitive means for indicating the nature of said discharge.

References Cited in the file of this patent

UNITED STATES PATENTS 1,781,914     Comer _____ Nov. 18, 1930